United States Patent
Fujikura et al.

(10) Patent No.: US 10,247,405 B2
(45) Date of Patent: Apr. 2, 2019

(54) LIGHT SOURCE UNIT, PROJECTOR, AND METHOD OF ASSEMBLING A LIGHT SOURCE UNIT

(71) Applicant: CASIO COMPUTER CO., LTD., Shibuya-ku, Tokyo (JP)

(72) Inventors: Hirofumi Fujikura, Hino (JP); Kyosuke Ogawa, Tokyo (JP)

(73) Assignee: CASIO COMPUTER CO., LTD., Tokyo (JP)

(\*) Notice: Subject to any disclaimer, the term of this patent is extended or adjusted under 35 U.S.C. 154(b) by 0 days.

(21) Appl. No.: 15/883,060

(22) Filed: Jan. 29, 2018

(65) Prior Publication Data

US 2018/0231232 A1 Aug. 16, 2018

(30) Foreign Application Priority Data

Feb. 15, 2017 (JP) .................... 2017-025502

(51) Int. Cl.
| | |
|---|---|
| *F21V 31/00* | (2006.01) |
| *F21K 9/00* | (2016.01) |
| *B23P 19/04* | (2006.01) |
| *F21V 29/70* | (2015.01) |
| *G03B 21/20* | (2006.01) |
| *F21V 15/01* | (2006.01) |
| *G03B 21/14* | (2006.01) |

(52) U.S. Cl.
CPC .......... *F21V 31/005* (2013.01); *B23P 19/04* (2013.01); *F21K 9/00* (2013.01); *F21V 15/01* (2013.01); *F21V 29/70* (2015.01); *G03B 21/145* (2013.01); *G03B 21/2093* (2013.01)

(58) Field of Classification Search
CPC ...... G03B 21/00; G03B 21/16; G03B 21/145; G03B 21/2093; H04N 9/3141; H04N 9/3144
See application file for complete search history.

(56) References Cited

U.S. PATENT DOCUMENTS

| | | | | |
|---|---|---|---|---|
| 2002/0021415 | A1* | 2/2002 | Fujimori | ............ G03B 21/16 353/31 |
| 2011/0279788 | A1* | 11/2011 | Nakajima | ............ B01D 46/008 353/61 |
| 2013/0050657 | A1* | 2/2013 | Morohoshi | ............ G03B 21/145 353/52 |

(Continued)

FOREIGN PATENT DOCUMENTS

| | | |
|---|---|---|
| JP | 2012160285 A | 8/2012 |
| JP | 2013030401 A | 2/2013 |

(Continued)

OTHER PUBLICATIONS

Japanese Office Action (and English language translation thereof) dated Nov. 29, 2018 issued in counterpart Japanese Application No. 2017-025502.

*Primary Examiner* — Sultan Chowdhury (74) *Attorney, Agent, or Firm* — Holtz, Holtz & Volek PC (57) ABSTRACT

A light source unit according to an embodiment includes a device holder including a semiconductor light emitting device; a holder case including an opening where the device holder is disposed; and a dustproof member including a frame-shaped dustproof portion disposed in a gap between an outer periphery of the device holder and a wall surface of the opening.

17 Claims, 10 Drawing Sheets

(56) References Cited

U.S. PATENT DOCUMENTS

| | | | |
|---|---|---|---|
| 2013/0050664 A1* | 2/2013 | Morohoshi | G03B 21/145 |
| | | | 353/119 |
| 2016/0077414 A1* | 3/2016 | Nishiyama | H04N 9/3111 |
| | | | 348/748 |
| 2018/0045399 A1 | 2/2018 | Chen et al. | |

FOREIGN PATENT DOCUMENTS

| | | |
|---|---|---|
| JP | 2016057609 A | 4/2016 |
| JP | 2018512698 A | 5/2018 |
| WO | 2016146047 A1 | 9/2016 |

\* cited by examiner

LIGHT SOURCE UNIT, PROJECTOR, AND METHOD OF ASSEMBLING A LIGHT SOURCE UNIT

CROSS-REFERENCE TO RELATED APPLICATIONS

The present application claims the priority to Japanese patent application No. 2017-025502 filed on Feb. 15, 2017, the entire contents of which are incorporated herein by reference.

BACKGROUND OF THE INVENTION

Field of the Invention

The present invention relates to a light source unit, a projector including the light source unit, and a method of assembling the light source unit.

Description of the Related Art

Today data projectors as projectors for projecting screens of personal computers, video screens, images from image data stored in memory cards, or the like onto a screen are frequently used. In such projectors, a high-intensity discharge lamp as a light source has been mainly used. In recent years, however, a light emitting diode (LED), a laser light emitting device, an organic EL, or a luminescent material as a light emitting device of a light source unit has been developed and proposal for them has been offered.

For example, the projector disclosed in JP 2016-57609 A provides a plurality of laser diodes for emitting laser light of light in a range of blue wavelengths. The luminescent wheel is provided with a luminescent material area that emits light in a range of red wavelengths and a luminescent material area that emits light in a range of green wavelengths using laser light as excitation light. A plurality of laser diodes are provided in the laser holder. The laser holder is disposed in the illumination optical system housing so as to sandwich a dustproof sheet, which is a dustproof member, between the front surface of the laser holder and the illumination optical system housing. This dustproof sheet is a gasket made of an elastic material such as rubber formed into a sheet shape.

When the sheet-shaped dustproof member made of a conventional soft material is used, assembling has to be carried out such that the dustproof member is not twisted when it is disposed. When the dustproof member is twisted, dust may adhere to optical instruments such as a laser diode and a collimator lens disposed on the front face of the laser diode, which may cause reduction in light quantity and color unevenness.

The present invention provides a light source unit capable of preventing the entry of dust more than before, and a method of assembling the projector including the light source unit and the light source unit.

SUMMARY OF THE INVENTION

A light source unit according to an embodiment comprises: a device holder including a semiconductor light emitting device; a holder case including an opening where the device holder is disposed; and a dustproof member including a frame-shaped dustproof portion disposed in a gap between an outer periphery of the device holder and a wall surface of the opening.

A projector according to an embodiment comprises: the above light source unit; a display device which is irradiated with light source light from the light source unit to form image light; a projection side optical system configured to project the image light emitted from the display device onto a screen; and a projector control unit configured to control the display device and the light source unit.

A method of according to an embodiment is a method of assembling a light source unit. The light source unit comprises: a device holder including a semiconductor light emitting device; a holder case having an opening; a dustproof member including a frame-shaped dustproof portion, the frame-shaped dustproof portion including a packing portion and a support frame connected to the packing portion, the packing portion including an inner peripheral rib and an outer peripheral rib, the support frame being harder than the packing portion; and a plate. The method comprises: disposing the device holder in the opening of the holder case; disposing the dustproof member in a gap between an outer periphery of the device holder and a wall surface of the opening of the holder case on a side opposite to a light-emitting side with respect to the semiconductor light emitting device so that the packing portion instead of the support frame becomes a front end in an insertion direction; and fixing the plate to the holder case by pressing the dustproof member with the plate.

DETAILED DESCRIPTION OF THE PREFERRED EMBODIMENT

Figure 1:
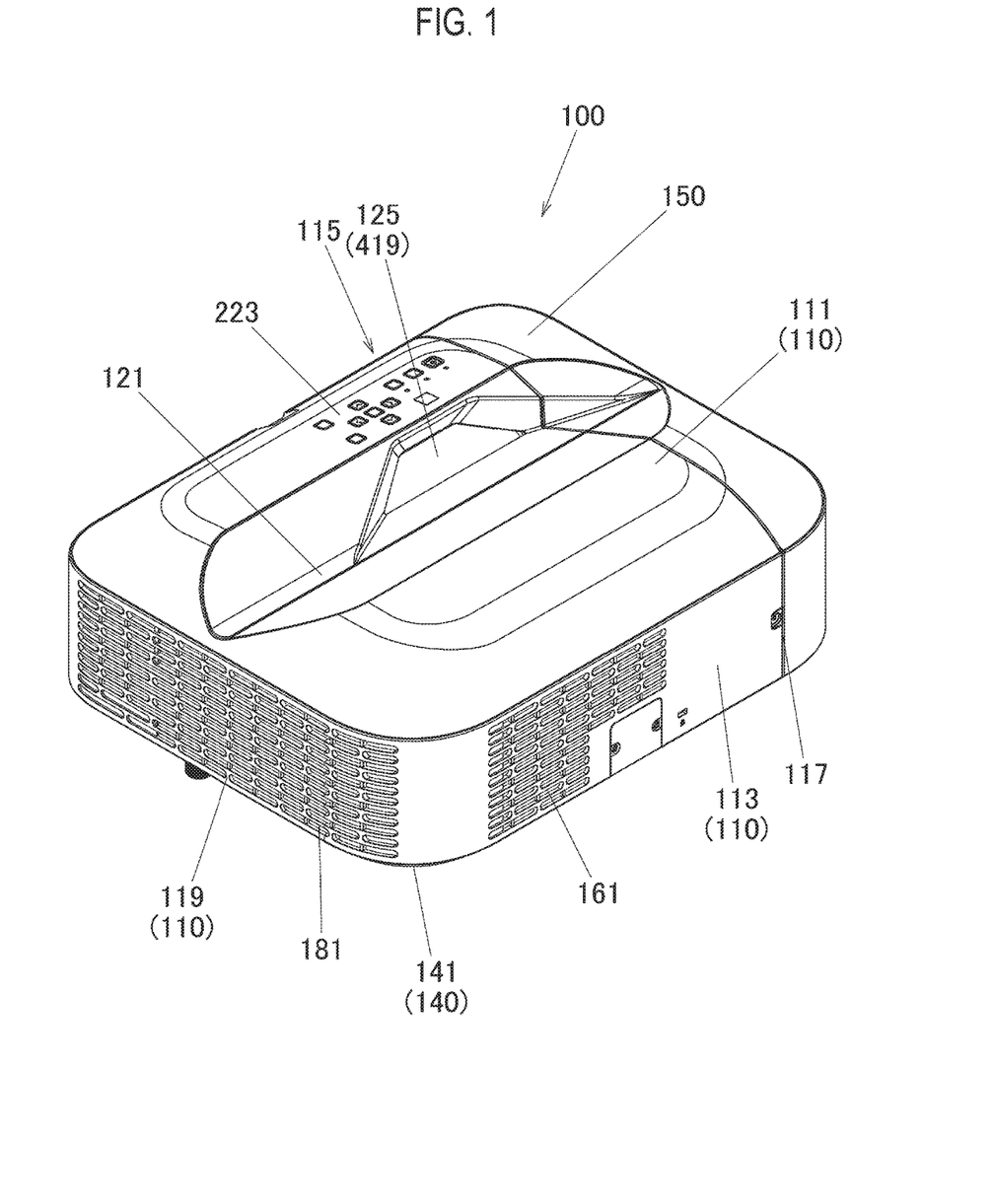
FIG. 1 is an external perspective view of a projector according to an embodiment of the present invention.

Hereinafter, embodiments for carrying out the present invention will be described. FIG. 1 is an external perspective view of a projector 100 according to an embodiment of the present invention. When left and right are referred to with respect to the main body of the projector 100, they denote the left-right direction with respect to the projection direction, when front and rear are referred to with respect to the main body of the projector 100, they denote the front-rear direction with respect to the projection direction, and the diagonal lower right direction in FIG. 1 is the front direction.

The projector 100 has a substantially rectangular parallelepiped shape as shown in FIG. 1. The projector 100 includes a housing body made up of an upper case 110 and a lower case 140, and a connector cover 150 covering a left side plate 117 detachable from the housing body. The connector cover 150 is formed in a concave shape so as to cover the outer peripheral edge of the left side plate 117. Various devices and circuit boards on a bottom plate 141 of the lower case 140 are covered by the upper case 110. The projector 100 has a front side suction hole 161 in a front side plate 113 of the upper case 110 and an exhaust hole 181 in a right side plate 119. Further, the projector 100 has a rear face side air intake hole and a hole portion for emitting sound from a speaker on a rear plate 115.

A key/indicator portion 223 is provided behind an upper surface plate 111 of the upper case 110. This key/indicator portion 223 is provided with a power switch key, a projection switch key for switching projection on/off, a power indicator notifying of power on/off, and a key or an indicator such as a heating indicator for warning when the light source module, the display device, the control circuit, or the like overheats.

The upper surface plate 111 of the upper case 110 has a substantially V-shaped cut groove 121 extending in the left-right direction across from the right side of the main body to the left side connector cover 150. A projection port 125 is formed in the cut groove 121. The projection port 125 allows image light to be emitted diagonally forward.

Although not shown, the left side plate 117 is provided with a video signal input D-SUB terminal into which an analog RGB video signal is input, an S terminal, an RCA terminal, an audio output terminal, and various types of terminals (group) including a power supply adapter or a plug. The left side plate 117 is also provided with an air intake hole.

Figure 2:
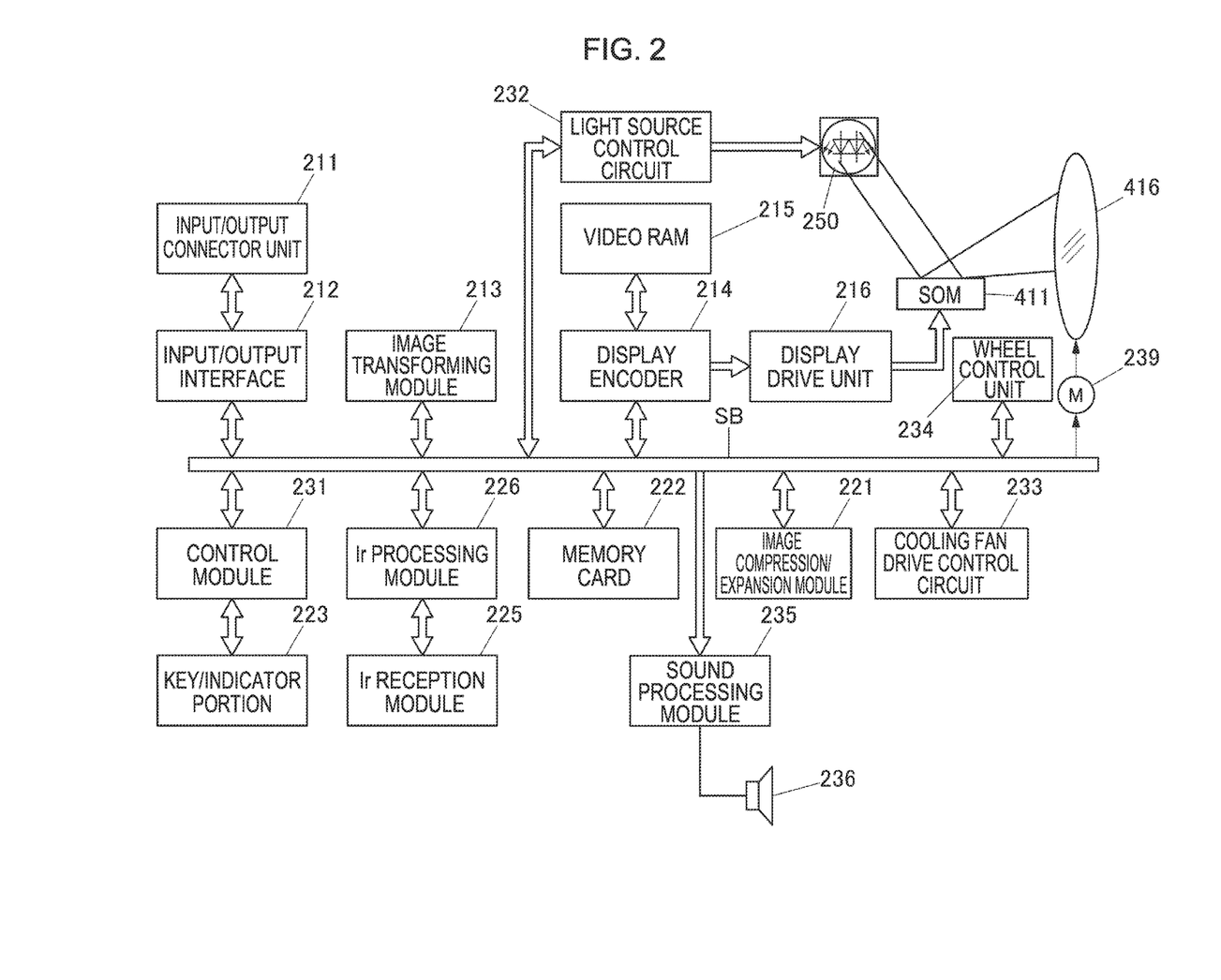
FIG. 2 is a functional circuit block diagram of the projector according to the embodiment of the present invention.

Next, a projector control unit and the like of the projector 100 will be described with reference to the functional block diagram of FIG. 2. The projector control unit includes a control module 231, an input/output interface 212, an image transforming module 213, a display encoder 214, a display drive unit 216, and the like.

After in this projector control unit the image signal of various standards input from an input/output connector unit 211 is converted to be unified into an image signal of a predetermined format suitable for display by the image transforming module 213 through the input/output interface 212, and a system bus (SB), it is output to the display encoder 214.

The control module 231 governs the operation control of each circuit in the projector 100, and includes a CPU as an arithmetic unit, a ROM that permanently stores operation programs such as various settings, a RAM used as a work memory, and the like.

In addition, the display encoder 214 develops and stores the input image signal in the video RAM 215, generates a video signal from the stored contents of the video RAM 215, and outputs it to the display drive unit 216.

The display drive unit 216 serves as a display device control means, and drives a display device 411, which is a spatial optical modulator (SOM), at an appropriate frame rate corresponding to the image signal output from the display encoder 214. The projector 100 includes a light source unit 250.

The control module 231 controls a light source control circuit 232 as a light source control means. This light source control circuit 232 individually controls light emitted from an excitation light shining device 310 and a red light source unit 350 of the light source unit 250, and controls the rotation of the luminescent plate 331 (see FIG. 3) in a green light source unit 330 by a wheel control unit 234 such that light source light in a predetermined wavelength range required for image generation is emitted from the light source unit 250.

The projector 100 irradiates the display device 411 with a pencil of light emitted from the light source unit 250 to form an optical image with the reflected light of the display device 411, and projects and displays the image on the screen or the like via a projection optical system.

The projection optical system includes a movable lens group 416. The movable lens group 416 is driven for zoom adjustment and focus adjustment by a lens motor 239.

The image compression/expansion module 221 reads out the image data recorded on a memory card 222 and expands individual image data that make up a series of dynamic images frame by frame. Then, the image compression/expansion module 221 outputs the image data to the display encoder 214 via the image transforming module 213 so as to enable the display of dynamic images and the like based on the image data stored on the memory card 222.

An operation signal from the key/indicator portion 223 provided on the upper case 110 is sent to the control module 231 immediately after the process. The key operation signal from the remote controller is received by an Ir reception module 225, and the code signal demodulated by an Ir processing module 226 is output to the control module 231.

A sound processing module 235 is connected to the control module 231 via a system bus (SB). The sound processing module 235 includes a sound source circuit such as a PCM sound source, converts the sound data into analog form in the projection mode and the reproduction mode, drives a speaker 236, and makes the sound emission diffusive.

Further, the control module 231 causes a cooling fan drive control circuit 233 to perform temperature detection by a plurality of temperature sensors provided in the light source unit 250 or the like, and controls the rotation speed of the cooling fan from the result of this temperature detection. Further, the control module 231 causes the cooling fan drive control circuit 233 to continue the rotation of a cooling fan even after the power of the main body of the projector 100 is turned off by a timer or the like, or controls to turns the main body of the projector 100 off based on the result of the temperature detection by the temperature sensor.

Figure 3:
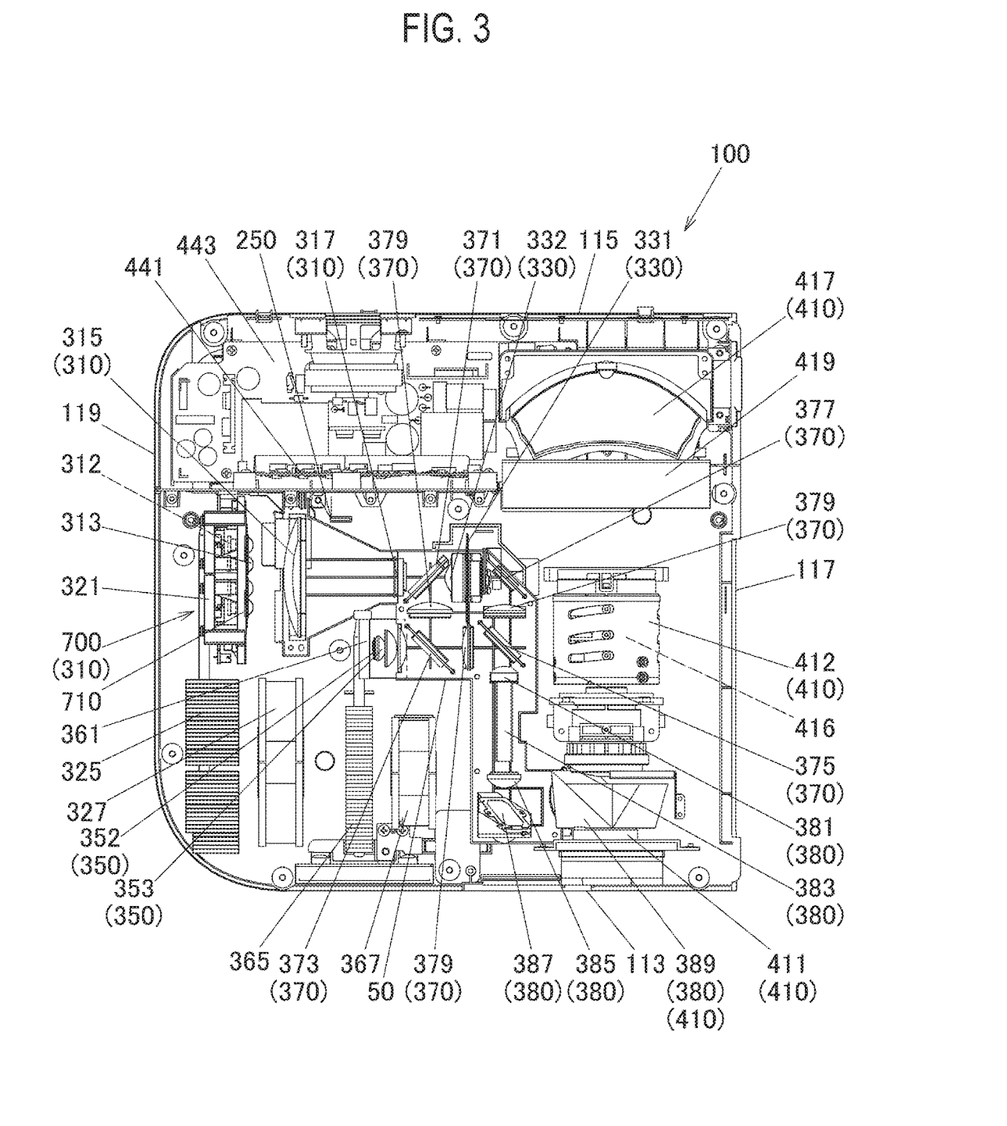
FIG. 3 is an internal structure schematic view of the projector according to the embodiment of the present invention.

Next, the internal structure of the projector 100 will be described. FIG. 3 is a schematic plan view showing the internal structure of the projector 100. The projector 100 includes a main control circuit board 441 and a power supply control circuit board 443 in the vicinity of a rear plate 115.

The light source unit 250 includes the green light source unit 330 in a light source case 50. In addition, the light source unit 250 includes a light guiding optical system 370 and a light-source-side optical system 380 as a light guide path. In FIG. 3, the upper case of the light source case 50 is omitted.

The excitation light shining device 310 is disposed in the vicinity of the right side plate 119 in the housing of the projector 100. A plurality of blue laser diodes 312, which are semiconductor light emitting devices, are provided in an excitation light source holding module 700 of the excitation light shining device 310. In addition, a collimator lens 313 is disposed on the optical axis of each blue laser diode 312 to convert light emitted from the blue laser diode 312 into parallel light so as to enhance the directivity of light.

A collective lens 315 is provided on the front face of the collimator lens 313. The collective lens 315 collects light in a range of blue wavelengths emitted from each of the collimator lenses 313, and guides it to a diffuse plate 317. The diffuse plate 317 transmits the incident light in a range of blue wavelengths while diffusing it, and guides it to the green light source unit 330.

The red light source unit 350 includes a red light source 352 and a collective lens group 353. The red light source 352 is a red light emitting diode which is a semiconductor light emitting device that emits light in a range of red wavelengths. The red light source 352 is disposed so that light emitted from the blue laser diode 312 and the optical axis are parallel to each other. The collective lens group 353 collects light in a range of red wavelengths emitted from the red light source 352.

The red light source unit 350 includes, on the front side plate 113 side of the red light source 352, a heat sink 365, which is a cooling device, which is connected to the red light source unit 350 via the red light source 352 and a heat transfer module 361. Further, the excitation light shining device 310 includes a heat sink 325, a cooling device, which is connected to the blue laser diode 312 on the front side plate 113 side of the blue laser diode 312 via a heat transfer plate 321. A cooling fan 327 is disposed between the heat sink 325 and the heat sink 365. A cooling fan 367 is also disposed on the left side plate 117 side of the heat sink 365. The cooling air from the cooling fans 327, 367 is blown to the heat sink 325 of the excitation light shining device 310 and the heat sink 365 of the red light source unit 350. Therefore, the blue laser diode 312 and the red light source 352 are cooled by the respective heat sinks 325, 365.

The luminescent plate 331 constituting the green light source unit 330 is disposed substantially at the center of the projector 100. The luminescent plate 331 is formed in a disk shape and is disposed on the optical path of the excitation light emitted from the excitation light shining device 310. The luminescent plate 331 is rotationally driven by a motor.

A collective lens group 332 is disposed on the excitation light shining device 310 side of the luminescent plate 331, and a collective lens (not shown) is disposed also on a reflecting mirror 377 side, which is opposite the excitation light shining device 310 side.

The collective lens group 332 collects a pencil of light of the excitation light emitted from the excitation light shining device 310 and transmitting a first dichroic mirror 371 into the luminescent plate 331 and collects the luminescent light emitted from the luminescent plate 331 toward the excitation light shining device 310.

The luminescent plate 331 has a luminescent light emitting area and a transparent area provided continuously in its circumferential direction. The luminescent light emitting area receives light collected from the excitation light shining device 310 via the collective lens group 332 as excitation light and emits luminescent light in the green wavelength range. The transmission area transmits, or transmits the excitation light emitted from the excitation light shining device 310 while diffusing it.

As the base material of the luminescent plate 331, a metal base material made of copper, aluminum or the like can be used. An annular groove is formed on the surface of the base material on the excitation light shining device 310 side. Mirror processing with silver evaporation or the like is performed to the bottom of this groove, and a green luminescent material layer is laid on the bottom. Further, in the transmission area, a transparent base material having transparency is fitted in a cut through hole portion cut in the base material. In a case where an area that transmits the excitation light while diffusing it is disposed as the transmission area, a transparent base material having fine irregularities formed on its surface by sandblasting or the like is fitted into the cut through hole portion.

When the green luminescent material layer of the luminescent plate 331 is irradiated with light in a range of blue wavelengths emitted from the excitation light shining device 310, the green luminescent material is excited and light in a range of green wavelengths is emitted in all directions. Light in a range of green wavelengths in a luminescent fashion is emitted to the right side plate 119 side, and enters the collective lens group 332. On the other hand, light in a range of blue wavelengths emitted from the excitation light shining device 310 and entering the transparent area transmits the luminescent plate 331 or transmits the luminescent plate 331 while diffusing it, and enters the collective lens (not shown) disposed on the back side of the luminescent plate 331 (in other words, on the left side plate 117 side).

The light guiding optical system 370 includes a collective lens for collecting a pencil of light of light in a range of blue wavelengths, light in a range of red wavelengths, and light in a range of green wavelengths, and a reflecting mirror, a dichroic mirror or the like for converting the optical axes of pencils of light in the respective color wavelength ranges and guiding the optical axes to the same optical axis. Specifically, the light guiding optical system 370 includes the first dichroic mirror 371, a second dichroic mirror 373, a third dichroic mirror 375, the reflecting mirror 377, and a plurality of collective lenses 379.

The first dichroic mirror 371 is disposed between the diffuse plate 317 and the collective lens group 332. In addition, the first dichroic mirror 371 transmits light in a range of blue wavelengths and reflects light in a range of green wavelengths. Light in a range of green wavelengths emitted from the luminescent plate 331 is reflected by the first dichroic mirror 371 and guided to the second dichroic mirror 373 via a collective lens 379.

The second dichroic mirror 373 is disposed at a position where light in a range of green wavelengths reflected by the first dichroic mirror 371 intersects light in a range of red wavelengths emitted from the red light source unit 350. The second dichroic mirror 373 reflects light in a range of green wavelengths and transmits light in a range of red wavelengths. Light in a range of green wavelengths reflected by the second dichroic mirror 373 and light in a range of red wavelengths transmitting the second dichroic mirror 373 are caused to have their optical axes aligned and are guided to the third dichroic mirror 375 via the collective lens 379 provided on the left side plate 117 side of the second dichroic mirror 373.

Meanwhile, among light in a range of blue wavelengths emitted from the excitation light shining device 310 and diffused by the diffuse plate 317, light in a range of blue wavelengths that has entered the transmission area of the luminescent plate 331 is reflected by the reflecting mirror 377, and is guided to the third dichroic mirror 375 through the collective lens 379.

The third dichroic mirror 375 reflects light in a range of green wavelengths and light in a range of red wavelengths, and transmits light in a range of blue wavelengths. Therefore, light in a range of green wavelengths reflected by the second dichroic mirror 373 and light in a range of red wavelengths transmitting the second dichroic mirror 373 are reflected by the third dichroic mirror 375 and enter a collective lens 381 of the light-source-side optical system 380. On the other hand, light in a range of blue wavelengths reflected by the reflecting mirror 377 transmits the third dichroic mirror 375 and is guided to the collective lens 381 of the light-source-side optical system 380.

As described above, light in a range of blue wavelengths, light in a range of red wavelengths, and light in a range of green wavelengths is transmitted or reflected by the third dichroic mirror 375, whereby their optical axes coincide with each other.

The light-source-side optical system 380 includes the collective lens 381, a light tunnel 383, a collective lens 385, a light shining mirror 387, and a TIR (Total Internal Reflection) prism (total reflection prism) 389. The TIR prism 389 is also part of a projection side optical system 410 described later. The collective lens 381 collects light emitted from the third dichroic mirror 375. Light in a range of blue wavelengths, light in a range of red wavelengths, and light in a range of green wavelengths collected by the collective lens 381 enter the light tunnel 383. A pencil of light entering the light tunnel 383 has a uniform intensity distribution by the light tunnel 383.

The collective lens 385 is disposed on the optical axis of the light tunnel 383 on the front side plate 113 side. The pencil of light emitted from the light tunnel 383 is collected by the collective lens 385 and irradiates the light shining mirror 387.

The projection side optical system 410 has a TIR prism 389, the display device 411, a lens barrel 412, and an aspherical mirror 417. The pencil of light reflected by the light shining mirror 387 enters the TIR prism 389 and irradiates the image formation surface of the display device 411 disposed on the front side plate 113 side. The image light formed by the display device 411 is emitted to the aspherical mirror 417 via the fixed lens group or the movable lens group 416 in the lens barrel 412 provided on the rear plate 115 side.

The image light reflected by the aspherical mirror 417 is emitted to the outside of the projector 100 via a cover glass 419 (see also FIG. 1), and is projected on the screen.

With the configuration of the projector 100 as described above, when the luminescent plate 331 is rotated and light is emitted from the excitation light shining device 310 and the red light source unit 350 at different timings, light in a range of blue wavelengths, light in a range of red wavelengths, and light in a range of green wavelengths each sequentially enter the collective lens 381, the light tunnel 383, and the like of the light-source-side optical system 380 via the light guiding optical system 370, and after that enters the display device 411. Therefore, it is possible to project the color image on the screen by time-divisionally reflecting light of each color according to the data displayed with the DMD, which is the display device 411 of the projector 100.

Figure 4:
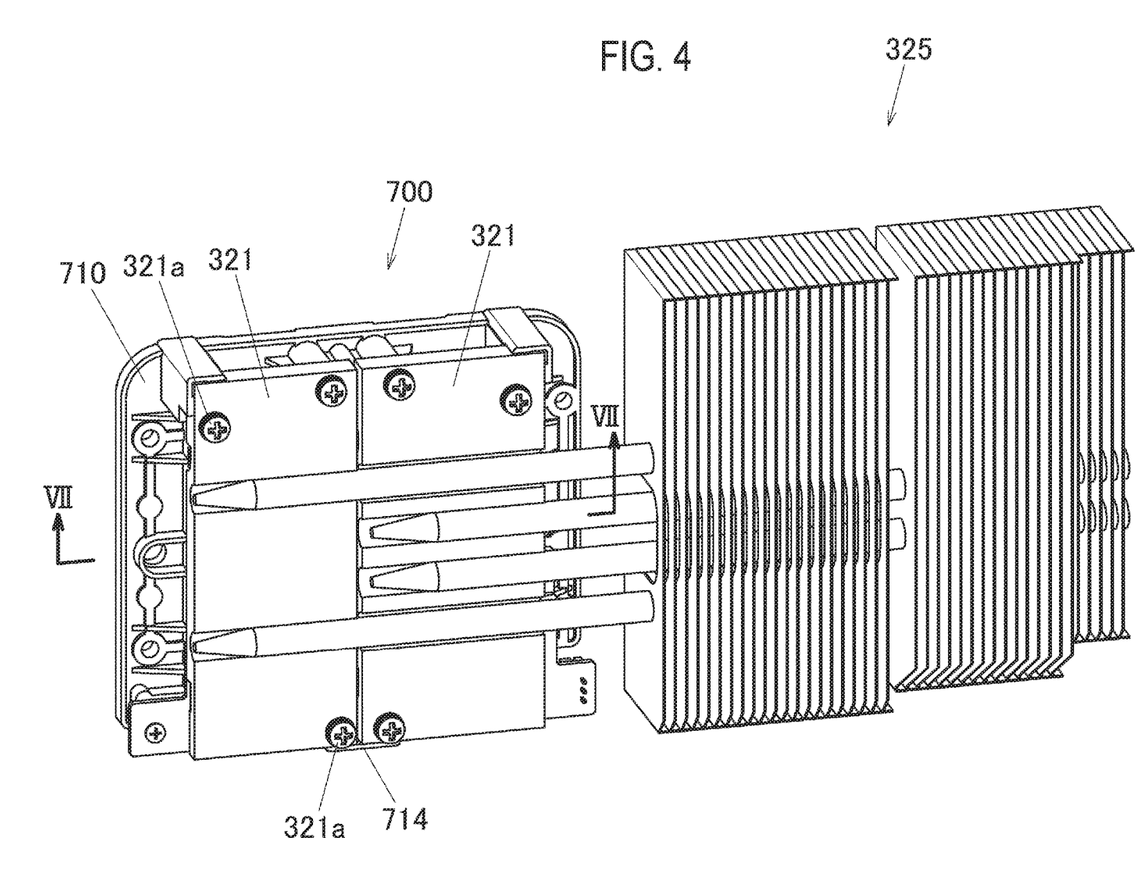
FIG. 4 is a perspective view of an excitation light source holding module and a heat sink of an excitation light shining device according to the embodiment of the present invention, as viewed from the rear side.
Figure 5:
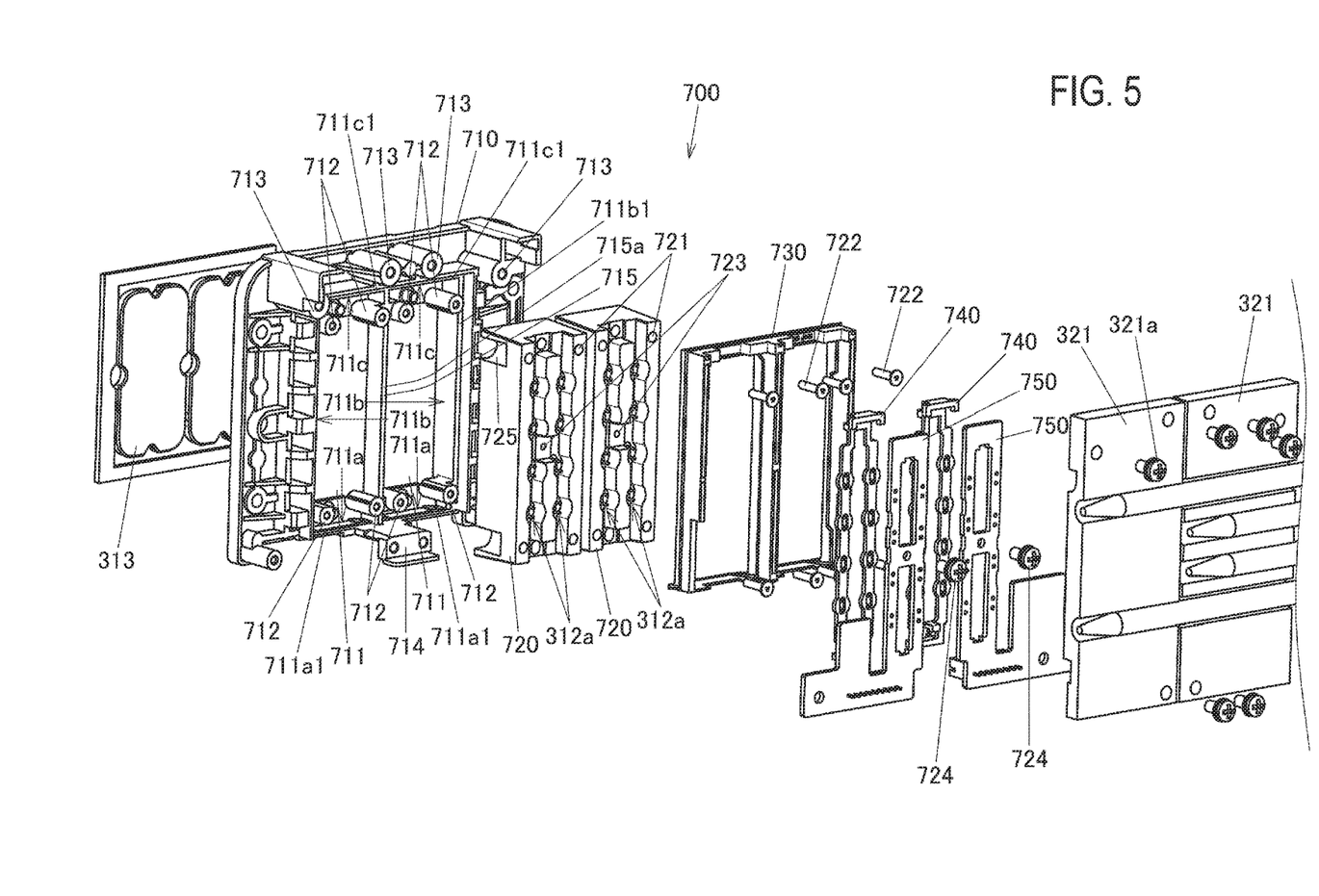
FIG. 5 is an exploded perspective view of the excitation light source holding module and the partially omitted heat sink of the excitation light shining device according to the embodiment of the present invention, as viewed from the rear side.
Figure 6:
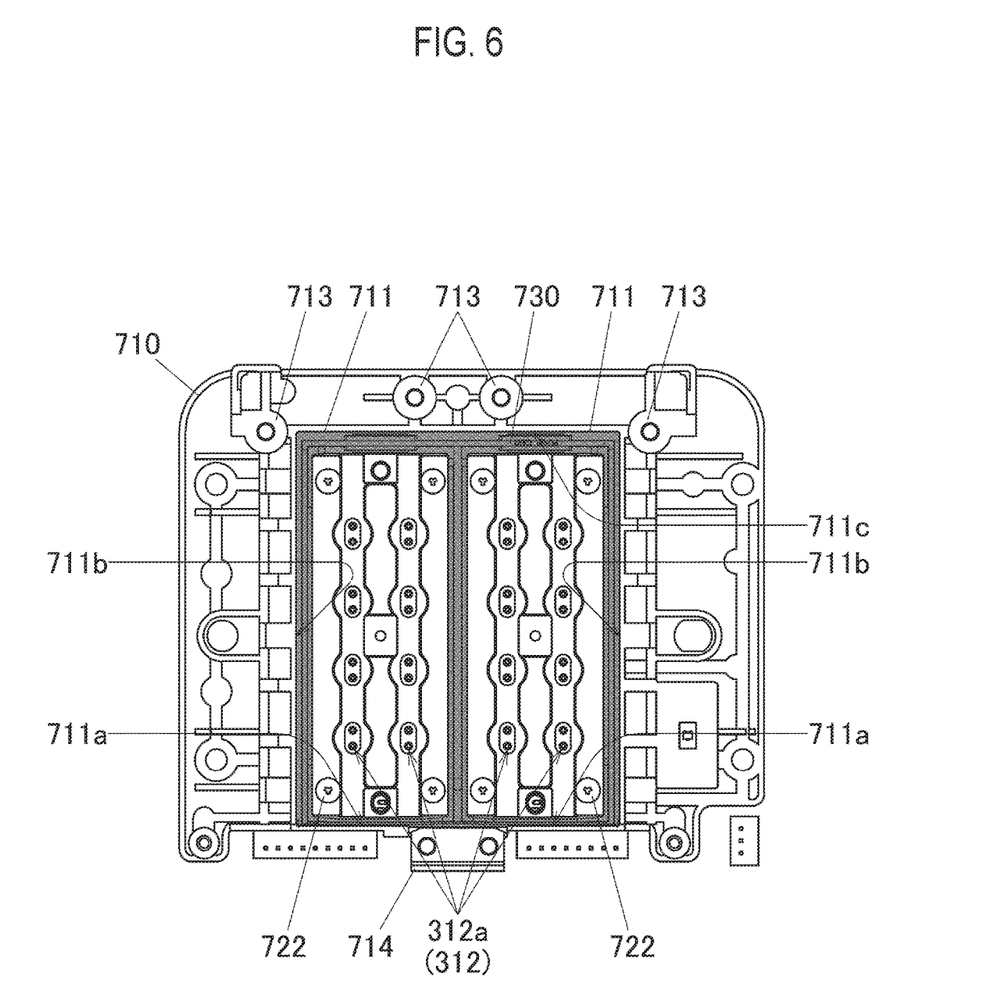
FIG. 6 is a rear view of a holder case in which an device holder and a dustproof member are disposed in an excitation light source holding module of an excitation light shining device according to an embodiment of the present invention.

Next, the configuration of the excitation light source holding module 700 of the excitation light shining device 310 will be described in detail with reference to FIGS. 4 to 8. Here, FIG. 4 is a perspective view of the excitation light source holding module 700 and the heat sink 325 as viewed from the back side (the right side plate 119 side in FIG. 3) of the blue laser diode 312. FIG. 5 is an exploded perspective view in which part of the excitation light source holding module 700 and the heat sink 325 is omitted. FIG. 6 is a rear view of the excitation light source holding module 700, in which a circuit board and a spacer for electrically connecting the heat transfer plate 321 and a plurality of blue laser diodes 312 are omitted.

The excitation light source holding module 700 is provided with a holder case 710 in the form of a substantially plate frame. As shown in FIG. 5, a beam-shaped central plate 715 is horizontally laid in the opening portion at the center of the holder case 710. The central plate 715 in the opening portion of the holder case 710 as described above provides two openings 711 in the opening portion of the holder case 710. Each of the openings 711 is formed in a rectangular shape long in the vertical direction. A boss 712 having a female threaded portion for attaching a device holder 720 to be described later is formed at each of the four corners of each of the openings 711. A wall surface 711a to 711c having normal lines substantially perpendicular to the opening face of each of the openings 711 is formed on the outer periphery of each of the openings 711 excluding the periphery of the central plate 715 side. Stepped surface 711a1 to 711c1 having steps projecting toward the inside of the opening 711 is formed on the wall surface 711a to 711c (see also FIG. 5).

Further, a plurality of bosses 713 in which female threaded portions are formed and a bracket 714 in which two female threaded portions are provided are formed outside the two adjacent openings 711. Six screws 321a are screwed into respective female threaded portions of the bosses 713 and the bracket portion 714, whereby the heat transfer plate 321 is fixed.

The device holder 720 is disposed in each opening 711 of the holder case 710. The device holder 720 has a substantially box-like block shape. In each device holder 720, eight blue laser diodes 312 are disposed in four rows and two columns. In FIG. 5, a terminal 312a protruding from the back side of the blue laser diode 312 is illustrated. Each device holder 720 has four screw holes 721. Further, a recessed portion 725 corresponding to the screw holes 721 is formed on the side surface of the device holder 720 on the long side. The boss 712 is accommodated in the recessed portion 725 of the device holder 720, and the four fixing screws 722 are disposed through the screw holes 721 and screwed with the female threaded portion of the bosses 712, whereby the device holder 720 is fixed to the holder case 710.

Figure 7:
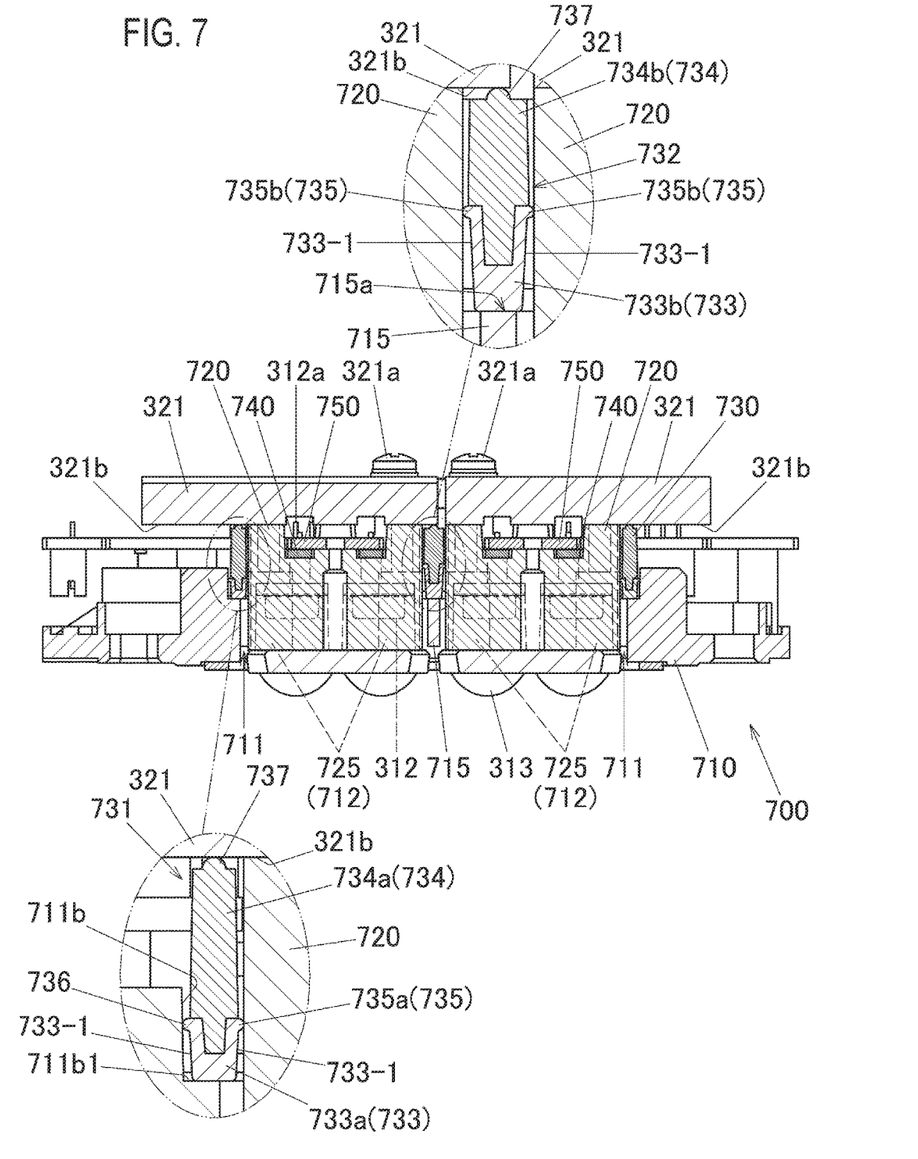
FIG. 7 is a VII-VII sectional view of FIG. 4 showing the excitation light source holding module and part of the heat sink of the excitation light shining device according to the embodiment of the present invention.
Figure 8:
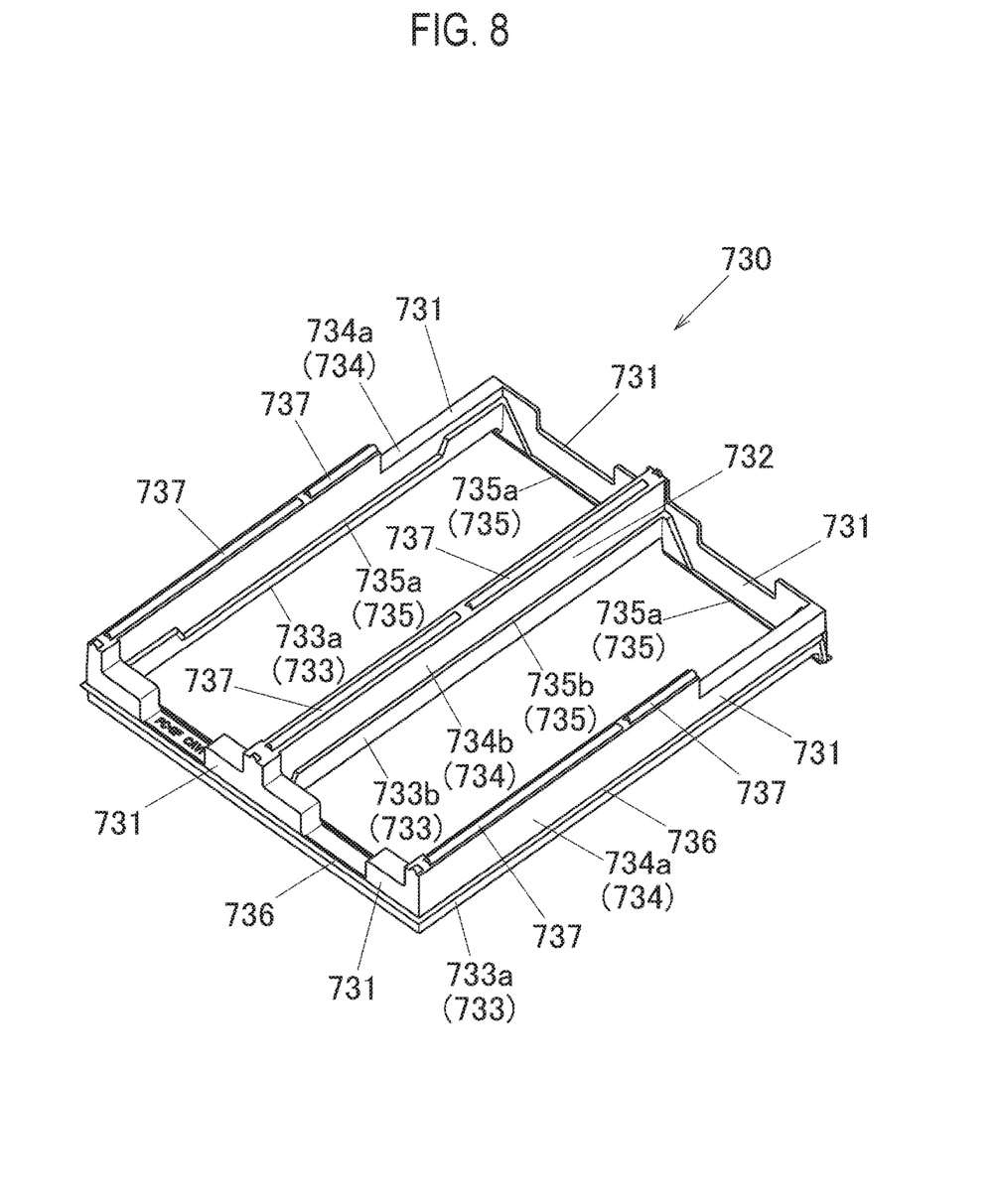
FIG. 8 is a perspective view of the dustproof member according to the embodiment of the present invention.

A dustproof member 730 is provided in the gap between the wall surface 711a to 711c of the opening 711 of the holder case 710 and the outer peripheral surface of each device holders 720 and the gap between the outer peripheral surfaces of the adjacent device holders 720 facing each other (See also FIG. 6 and FIG. 7). As shown in FIG. 8, the dustproof member 730 includes a frame-shaped dustproof portion 731 formed in a substantially frame shape. At the center of the dustproof member 730, an intermediate dustproof portion 732 formed in a substantial beam shape is formed across the sides of the frame-shaped dustproof portion 731 facing each other.

The dustproof member 730 includes the frame-shaped dustproof portion 731, the intermediate dustproof portion 732, a packing portion 733 disposed on the light-emitting side of the blue laser diode 312 in the optical axis direction (see FIG. 7), and a support frame 734 which is connected to the packing portion 733 opposite the light-emitting side of the blue laser diode 312 in the optical axis direction. The packing portion 733 is made of a soft material such as a silicon material, and the support frame 734 is made of a resin material harder than the packing portion 733.

The dustproof member 730 is an integrated product by insert molding in which the preformed support frame 734, which is inserted into a metal mold, is set as a primary side, and after that the packing portion 733, where a resin is injected, is set as a secondary side. Therefore, the connection between the packing portion 733 and the support frame 734 is strengthened. As shown in the sectional view of FIG. 7, the packing portion 733 is formed in a substantially V-shape in the vertical cross section view, and the support frame 734 is formed to be inserted into the V-shaped portion that widens in a concave shape (that is, the opening side having a concave shape). Opposing surfaces of the packing portion 733 are made to be an inclined surface 733-1 which expands in the direction of the support frame 734 side in the vertical cross section view.

An inner peripheral rib 735a and an outer peripheral rib 736 that respectively project sideways from the inner and outer peripheral surfaces of a packing portion 733a are formed in the packing portion 733a of the frame-shaped dustproof portion 731 in the vicinity of the boundary with the support frame 734a. In addition, an inner peripheral rib 735b, which is a side surface rib, that projects sideways from the both side surfaces of a packing portion 733b is formed in the packing portion 733b of the intermediate dustproof portion 732 in the vicinity of the boundary with a support frame 734b.

The inner peripheral rib 735a of the packing portion 733a in the frame-shaped dustproof portion 731 and the inner peripheral rib 735b of the packing portion 733b in the intermediate dustproof portion 732 are continuously formed to extend over the inner peripheral surface formed by the frame-shaped dustproof portion 731 and the intermediate dustproof portion 732. On the other hand, the outer peripheral rib 736 is formed continuously to the outer periphery of the frame-shaped dustproof portion 731. The inner peripheral rib 735a, 735b (the inner peripheral rib 735) and the outer peripheral rib 736 are not formed in a straight line but formed so that the height from the end face of the packing portion 733 varies depending on locations. The heights of the inner peripheral rib 735a and the outer peripheral rib 736 from the end face of the packing portion 733a are the same. Similarly, in the packing portion 733b, the heights of the inner peripheral ribs 735b from the end face of the packing portion 733b are the same.

Further, as shown in FIG. 8, a protrusion 737 is formed on the end face of the support frame 734 opposite the light-emitting side of the blue laser diode 312 in the optical axis direction (see FIG. 7). The protrusion 737 is formed in a substantially semi-elliptical shape in the vertical cross section view and is continuously formed in an appropriate length in the longitudinal direction (in the vertical direction of the projector 100 according to this embodiment).

Returning to FIG. 5, the collimator lens 313 is provided on the front surface of the device holder 720. In the present embodiment, eight collimator lenses 313 corresponding to the arrangement of the blue laser diodes 312 are integrally formed in a substantially plate shape for each device holder 720.

A circuit board 750 to which the terminal 312a of the blue laser diode 312 is electrically connected is provided on the rear surface of the device holder 720 via a spacer 740. A female threaded portion 723 is formed at the center of the device holder 720, and the spacer 740 and the circuit board 750 are fixed to the device holder 720 by screws 724. The heat transfer plate 321 is fixed to the holder case 710 by screwing the screw 321a into the female threaded portion of the boss 713 so as to contact the rear surface of the device holder 720.

As shown in FIG. 7, in the excitation light source holding module 700, the device holder 720 and the dustproof member 730 are fixed to the holder case 710. Here, the inner peripheral rib 735a of the packing portion 733a of the frame-shaped dustproof portion 731 of the dustproof member 730 comes into contact with the outer peripheral surface of the device holder 720. The outer peripheral rib 736 of the packing portion 733a of the frame-shaped dustproof portion 731 of the dustproof member 730 comes into contact with the wall surface 711a to 711c of the opening 711 of the holder case 710. FIG. 7 shows the state where the wall surface 711b and the outer peripheral rib 736 are in contact with each other. Further, each inner peripheral rib 735b, which is a side rib of the packing portion 733b of the intermediate dustproof portion 732, comes into contact with the outer peripheral surface of the adjacent device holders 720 facing each other.

Thus the gap between the outer periphery of the device holder 720 and the opening 711 of the holder case 710 and the gap between the device holders 720 are hermetically sealed by the inner peripheral rib 735 and the outer peripheral rib 736, so that the dust entering the front side of the device holder 720 from the rear side of the device holder 720 (that is, the light-emitting side of the blue laser diode 312) is reduced.

Since the dustproof member 730 is formed so that the soft packing portion 733 is supported by the rigid support frame 734, when the dustproof member 730 is inserted into the gap between the device holder 720 and the opening 711 of the holder case 710, the possibility of twisting of the packing portion 733 is reduced. Further, even if the dustproof member 730 is held by hand, its shape does not easily collapse, so that the assembling work efficiency is improved.

Further, after the dustproof member 730 is inserted into the gap between the outer periphery of the device holder 720 and the opening 711 of the holder case 710, the heat transfer plate 321 is attached to the holder case 710. At this time, a surface 321b of the heat transfer plate 321 on the device holder 720 side comes into contact with the protrusion 737 of the dustproof member 730. Then, as the screw 321a fixing the heat transfer plate 321 is squeezed, the support frame 734 is pressed against the heat transfer plate 321, and the support frame 734 presses evenly the packing portion 733 from the rear side of the device holder 720. Further, when the screw 321a is squeezed, the end face of the packing portion 733a of the frame-shaped dustproof portion 731 (that is, the surface of the blue laser diode 312 on the light-emitting side) comes into contact with the stepped surface 711a1, 711b1, 711c1 of the opening 711, and the end surface of the packing portion 733b of the intermediate dustproof portion 732 comes into contact with an edge surface 715a of the central plate 715 facing the end surface. Then, the pressing force from the heat transfer plate 321 is increased, and the packing portion 733 is strongly compressed and greatly deformed, so that the inner peripheral rib 735 and the outer peripheral rib 736 come into further strongly close contact with the wall surface 711a to 711c and the side surface of the device holder 720.

Since the inclined surface 733-1 of the packing portion 733 prevents both side surfaces of the packing portion 733 from contacting the outer peripheral surface of the device holder 720 and the wall surface 711a to 711c of the opening 711, the inner peripheral rib 735 and the outer peripheral rib 736 alone of the packing portion 733 come into contact with the outer peripheral surface of the device holder 720 and the wall surface 711a to 711c of the opening 711. Therefore, the inner peripheral rib 735 and the outer peripheral rib 736 of the packing portion 733 receive the side pressure from the outer peripheral surface of the device holder 720 and the wall surface 711a to 711c of the opening 711 by the pressing force from the heat transfer plate 321 to be reliably compressed. In this way, the inner peripheral rib 735 and the outer peripheral rib 736 of the packing portion 733 securely come into close contact with the outer peripheral surface of the device holder 720 and the wall surface 711a to 711c of the opening 711.

Further, the contact between the end face of the packing portion 733a of the frame-shaped dustproof portion 731 and the stepped surface 711a1, 711b1, 711c1 of the opening 711, and the contact between the end face of the packing portion 733b of the intermediate dustproof portion 732 and the edge surface 715a of the central plate 715, which are contact surfaces, are considered to be a sealing in addition to the sealing by the inner peripheral rib 735 and the outer peripheral rib 736.

In addition, since the protrusion 737 having a substantially elliptical shape in the vertical cross section view comes into line contact with the heat transfer plate 321, and the frictional force between them is reduced, the twisting and bending of the support frame 734 at the time of pressing the heat transfer plate 321 is reduced. Further, if there is no protrusion 737 of a support frame 734a, 734b and the upper surface contacting the heat transfer plate 321 is flat, part of the upper surface of the support frame 734a, 734b may be sandwiched by the heat transfer plate 321 and the device holder 720. Since the support frame 734a, 734b has the protrusion 737, it is possible to prevent part of the upper surface of the support frame 734a, 734b from being caught between the heat transfer plate 321 and the device holder 720, and to stabilize the cooling performance.

A method of assembling the light source unit 250 includes providing the device holder 720 including the semiconductor light emitting device, the holder case 710 having the opening 711, the dustproof member 730 including the frame-shaped dustproof portion 731, wherein the frame-shaped dustproof portion 731 includes the packing portion 733 and the support frame 734 connected to the packing portion 733, wherein the packing portion 733 includes the inner peripheral rib 735a and the outer peripheral rib 736, wherein the support frame 734 is harder than the packing portion 733, and the plate 321, arranging the device holder 720 in the opening 711 of the holder case 710, arranging the dustproof member 730 in a gap between an outer periphery of the device holder 720 and a wall surface of the opening 711 of the holder case 710 from a side opposite to a light emitting direction side of the semiconductor light emitting element so that the packing portion 733 instead of the support frame 734 becomes a front end in an insertion direction; and pressing the dustproof member 730 with the plate 321 to fix the plate 321 to the holder case 710.

Note that the packing portion 733 of the frame-shaped dustproof portion 731 is disposed on the light-emitting side of the semiconductor light emitting device in the optical axis direction, and the support frame 734 of the frame-shaped dustproof portion 731 is disposed on the side opposite the light-emitting side of the semiconductor light emitting device in the optical axis direction, but the invention is not limited to this configuration. As long as the dustproof member 730 is inserted so that the packing portion 733 instead of the support frame 734 becomes the front end in the insertion direction when the dustproof member 730 is disposed in the gap between the outer periphery of the device holder 720 and the wall surface of the opening 711 of the holder case 710, the packing portion 733 of the frame-shaped dustproof portion 731 may be disposed on the side opposite to the light-emitting side of the semiconductor light emitting device in the optical axis direction, and the support frame 734 of the frame-shaped dustproof portion 731 may be disposed on the light-emitting side of the semiconductor light emitting device in the optical axis direction.

Figure 9:
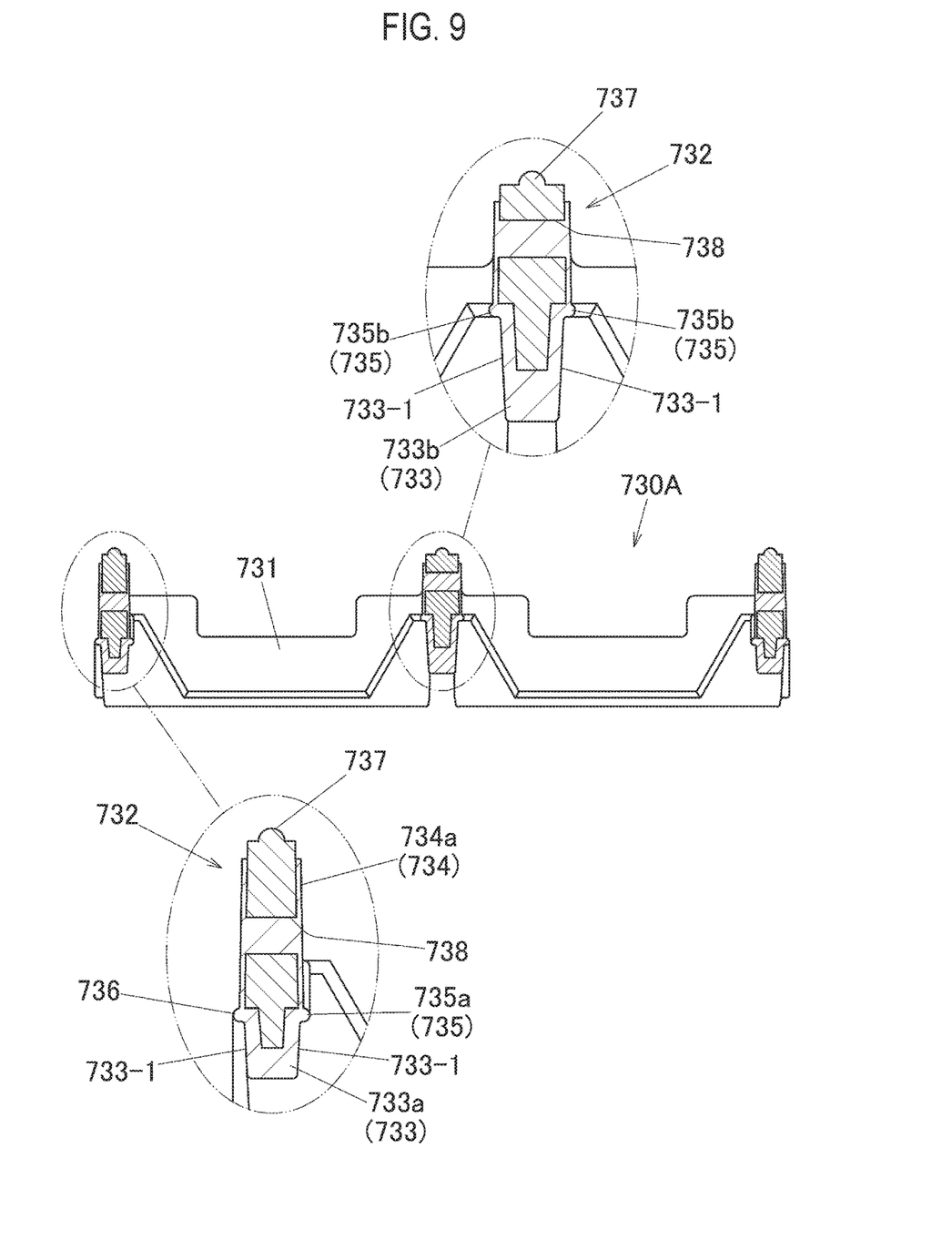
FIG. 9 is a view of a modification of the dustproof member according to the embodiment of the present invention, and is a sectional view of the only dustproof member in a cross section corresponding to the cross section of FIG. 7.

Next, a modification of the dustproof member 730 will be described. The support frame 734 of a dustproof member 730A shown in FIG. 9 is provided with a plurality of through holes 738 which are hole portions penetrating its side surface. Then, the packing portion 733 is engaged with the through hole 738. Specifically, the packing portion 733, which is set as the secondary side in the insert molding, also fills the through hole 738. In this way, the bonding of the support frame 734 and the packing portion 733 can be made stronger.

It is to be noted that in the case of insert molding, the packing portion 733 may be poured in the through hole 738, which is a hole portion recessed in the side surface of the support frame 734, or when the dustproof member 730 is formed by assembling, a convex portion may be formed in the packing portion 733 and fitted into this hole portion or the like.

Figure 10A:
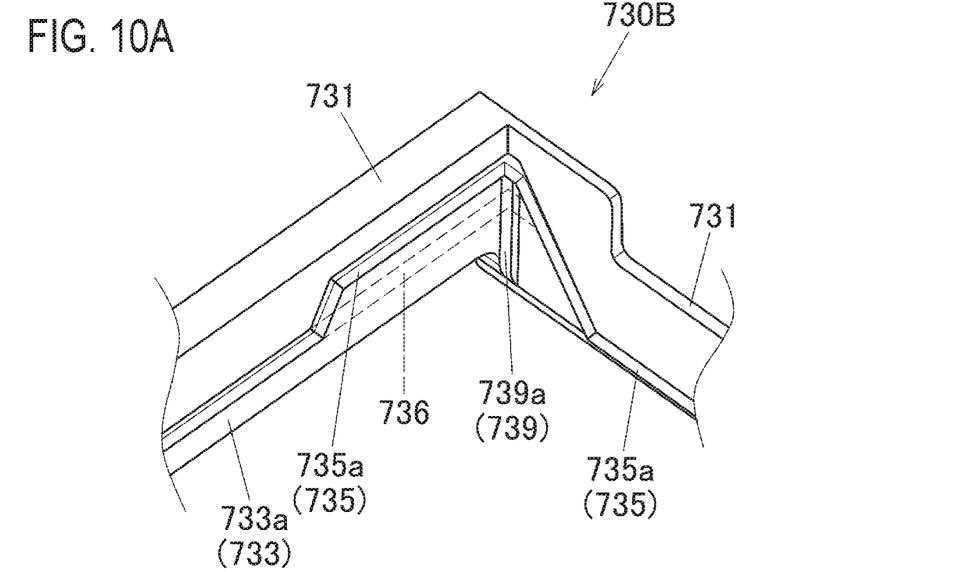
FIG. 10A is a view of another modification of the dustproof member according to the embodiment of the present invention, and is a perspective view of part of the dustproof member showing an example in the modification.

Next, another modification of the dustproof member 730 will be described. The dustproof member 730B shown in FIG. 10A is provided with a support rib 739a connected to the inner peripheral rib 735a on the inner peripheral surface of the corner portion of the packing portion 733a in the direction orthogonal to the inner peripheral rib 735a. In this modification, the height from the end face of the packing portion 733a to the inner peripheral rib 735a is partially different from the height from the end face of the packing portion 733a to the outer peripheral rib 736. Specifically, the height of the outer peripheral rib 736 is set to be lower than the height of the inner peripheral rib 735a in this portion.

As long as in the above-described embodiment, the heights of the inner peripheral rib 735a and the outer peripheral rib 736 (the heights of the inner peripheral ribs 735b on both sides with respect to the intermediate dustproof portion 732) are the same, the timing at which the packing portion 733 receives the side pressure becomes simultaneous when the dustproof member 730 is inserted, and the packing portion 733 is preferably inserted into the gap between the device holder 720 and the wall surface 711a to 711c of the opening 711 and the gap between the device holders 720 uniformly. However, depending on the shape around the opening 711, in order to avoid interference, it is sometimes impossible to make the heights of the inner peripheral rib 735a, the outer peripheral rib 736, and the inner peripheral rib 735b equal to each other. In this way, even when the corresponding positions of the inner peripheral rib 735a and the outer peripheral rib 736 facing each other are different, or even when the corresponding positions of the inner peripheral ribs 735b facing each other are different, providing the support rib 739 makes it possible to insert the packing portion 733 into the gap in a balanced manner by supporting one of the inner peripheral rib 735a and the outer peripheral rib 736 which are positioned symmetrically, and one of the inner peripheral ribs 735b with the support rib 739 and reinforcing them.

Figure 10B:
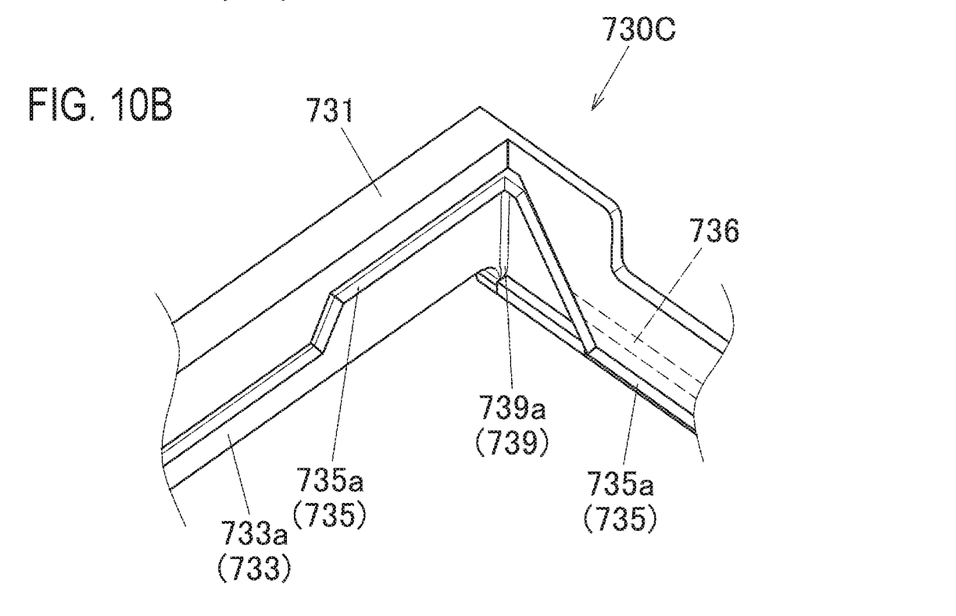
FIG. 10B is a view of another modification of the dustproof member according to the embodiment of the present

In addition, although the support rib 739a in FIG. 10A is provided in a direction orthogonal to the inner peripheral ribs 735a to be connected, the present invention is not limited to this configuration, and for example, like the dustproof member 730C shown in FIG. 10B, the support rib 739a may be provided to be connected to the inner peripheral rib 735a substantially in parallel with the inner peripheral rib 735a. In addition, the support rib 739 may be provided so as to be connected to the outer peripheral rib 736. Note that the height of the support rib 739 from the side surface of the packing portion 733 may be equal to or less than the height of the inner peripheral rib 735 and the outer peripheral rib 736. In addition, the shape of the support rib 739 is preferably rectangular as shown in FIGS. 10A and 10B in view of reinforcement strength.

According to the embodiment of the present invention described above, the light source unit 250 includes the device holder 720 provided with a blue laser diode 312, which is the semiconductor light emitting device, the holder case 710, and the dustproof member 730 including the frame-shaped dustproof portion 731, wherein the frame-shaped dustproof portion 731 includes the packing portion 733 and the support frame 734 which is connected to the packing portion 733, wherein the packing portion 733 includes the inner peripheral rib 735 disposed on the light-emitting side of the blue laser diode 312 in the optical axis direction and coming into contact with the outer peripheral surface of the device holder 720, and the outer peripheral rib 736 coming into contact with the wall surface 711a to 711c of the opening 711 of the holder case 710, wherein the support frame 734 is harder than the packing portion.

As a result, the gap between the outer peripheral surface of the device holder 720 and the wall surface 711a to 711c at the opening 711 of the holder case 710 is securely sealed, so that it is possible to greatly reduce the intrusion of dust from the gap. Furthermore, since the dustproof member 730 is not easily twisted, the assembly work efficiency of the light source unit 250 is improved.

In addition, the packing portion 733 of the frame-shaped dustproof portion 731 is disposed on the light-emitting side of the blue laser diode 312 in the optical axis direction, and the support frame 734 of the frame-shaped dustproof portion 731 is disposed on the side opposite to the light-emitting side of the blue laser diode 312 in the optical axis direction. As a result, when the dustproof member 730 is disposed in the gap between the outer periphery of the device holder 720 and the wall surface of the opening 711 of the holder case 710 from the rear side of the device holder 720, it is possible to reduce twisting of the packing portion 733 or the like.

Two device holders 720 are provided, and the intermediate dustproof portion 732 is disposed between the adjacent device holders 720. Note that three or more device holders 720 may be provided. The intermediate dustproof portion 732 is formed in a beam shape across the packing portion 733 and the support frame 734 on the facing sides of the frame-shaped dustproof portion 731 of the dustproof member 730. Thereby, it is possible to provide the light source unit 250 including a plurality of device holders 720 and capable of emitting bright light source light.

Further, the dustproof member 730 is formed by insert molding. Thus, it is possible to reduce the number of steps for manufacturing the dustproof member 730.

The opening 711 of the holder case 710 is provided with stepped surface 711a1 to 711c1 in the wall surface 711a to 711c, and the edge surface 715a of the central plate 715, which are contact surfaces to be brought into contact with the end surface of the packing portion 733. On the other hand, the protrusion 737 is formed on the end face of the support frame 734. As a result, the inner peripheral rib 735 and the outer peripheral rib 736 reliably receive the side pressure by the pressing force of the heat transfer plate 321, and the degree of adhesion between the inner peripheral rib 735 and the outer peripheral rib 736 increases. Further, it is possible to perform sealing by the end face of the packing portion 733.

The inner peripheral rib 735 and the outer peripheral rib 736 are formed on the end face of the packing portion 733 on the support frame 734 side, and the packing portion 733 is formed in a substantially V shape in the vertical cross section view. As a result, interference between the side surface of the packing portion 733, and the wall surface 711a to 711c of the opening 711 and the outer peripheral surface of the device holder 720 is avoided, so that the inner peripheral rib 735 and the outer peripheral rib 736 can be securely fixed to the wall surface 711a to 711c of the opening 711 and the outer peripheral surface of the device holder 720.

Further, the support frame 734 includes a hole portion such as the through hole 738 and a concave depression, and the packing portion 733 is engaged with the hole portion. Thereby, the support frame 734 and the packing portion 733 can be firmly integrated with each other.

In addition, the packing portion 733 includes the support rib 739a, 739b connected to the inner peripheral rib 735 or the outer peripheral rib 736. As a result, even when the inner peripheral rib 735 and the outer peripheral rib 736 have different heights from the end surfaces of the packing portion 733, the dustproof member 730 can be inserted into the gap in a well-balanced manner.

Further, the device holder 720 includes a plurality of blue laser diodes 312. Thereby, it is possible to provide the light source unit 250 having a high dustproof property while providing a bright light source.

Further, the device holder 720 is on its back surface provided with the heat transfer plate 321 connected to the heat sink 365. Thereby, it is possible to provide the light source unit 250 having a high dustproof property while cooling the semiconductor light emitting device.

Further, the projector 100 includes the light source unit 250, the display device 411, the projection side optical system 410, and the projector control unit. Thereby, it is possible to provide the projector 100 including the light source unit 250 having a high dustproof property.

Having thus described several embodiments of the invention, these embodiments are presented by way of example and are not intended to limit the scope of the invention. These novel examples can be carried out in other various forms, and various omissions, replacements or modifications can be made thereto without departing from the spirit and scope of the invention. The examples of the embodiment and modifications that are made thereto are to be incorporated in the spirit and scope of the invention and are also to be incorporated in the scope of inventions set forth in claims and equivalents thereof.

What is claimed is:

1. A light source unit comprising:
a device holder including a semiconductor light emitting device;
a holder case including an opening where the device holder is disposed; and
a dustproof member including a frame-shaped dustproof portion disposed in a gap between an outer periphery of the device holder and a wall surface of the opening,
wherein the frame-shaped dustproof portion includes (i) a packing portion including an inner peripheral rib which contacts an outer peripheral surface of the device holder, and an outer peripheral rib which contacts the wall surface, and (ii) a support frame connected to the packing portion, the support frame being harder than the packing portion.

2. The light source unit according to claim 1, wherein:
the packing portion of the frame-shaped dustproof portion is disposed on a light-emitting side of the semiconductor light emitting device in an optical axis direction, and
the support frame of the frame-shaped dustproof portion is disposed on a side opposite to the light-emitting side of the semiconductor light emitting device in the optical axis direction.

3. The light source unit according to claim 1, wherein:
a plurality of the device holders are provided in the opening, and
the dustproof member includes an intermediate dustproof portion,
the intermediate dustproof portion is continuously formed in a beam shape across portions of the packing portion and the support frame that face each other, and
the intermediate dustproof portion includes a side rib, the side rib being disposed between the adjacent device holders, the side rib contacting outer peripheral surfaces of the device holders that face each other, and the side rib being connected to the inner peripheral rib.

4. The light source unit according to claim 2, wherein:
a plurality of the device holders are provided in the opening, and
the dustproof member includes an intermediate dustproof portion,
the intermediate dustproof portion is continuously formed in a beam shape across portions of the packing portion and the support frame that face each other, and
the intermediate dustproof portion includes a side rib, the side rib being disposed between the adjacent device holders, the side rib contacting outer peripheral surfaces of the device holders that face each other, and the side rib being connected to the inner peripheral rib.

5. The light source unit according to claim 1, wherein the dustproof member is formed by insert molding.

6. The light source unit according to claim 2, wherein the dustproof member is formed by insert molding.

7. The light source unit according to claim 3, wherein the dustproof member is formed by insert molding.

8. The light source unit according to claim 4, wherein the dustproof member is formed by insert molding.

9. The light source unit according to claim 1, wherein:
the holder case has a contact surface contacting an end face of the packing portion, and
the support frame includes a protrusion on an end of the support frame.

10. The light source unit according to claim 1, wherein:
the inner peripheral rib and the outer peripheral rib are formed in the packing portion in a vicinity of a boundary with the support frame,
the packing portion comprises a V-shaped portion having a V shape, and the inner peripheral rib and the outer peripheral rib are disposed on an upper side of the V shape in a vertical cross section view, and
the support frame is inserted into the V-shaped portion of the packing portion, the V-shaped portion widening at a connecting portion with the support frame.

11. The light source unit according to claim 1, wherein:
the support frame includes a hole portion, and
the packing portion is engaged with the hole portion.

12. The light source unit according to claim 1, wherein the packing portion includes a support rib connected to the inner peripheral rib or the outer peripheral rib.

13. The light source unit according to claim 12, wherein the support rib is provided in a case where corresponding positions of the inner peripheral rib and the outer peripheral rib facing each other are different, or in a case where corresponding positions of the inner peripheral rib facing each other are different.

14. The light source unit according to claim 1, wherein the device holder includes a plurality of the semiconductor light emitting devices.

15. The light source unit according to claim 1, wherein a plate is disposed on a rear surface of the device holder, the plate being connected to a cooling device.

16. A projector comprising:
the light source unit according to claim 1;
a display device which is irradiated with light source light from the light source unit to form image light;
a projection side optical system configured to project the image light emitted from the display device onto a screen; and
a projector control unit configured to control the display device and the light source unit.

17. A method of assembling a light source unit, wherein the light source unit includes (i) a device holder including a semiconductor light emitting device, (ii) a holder case having an opening, (iii) a dustproof member including a frame-shaped dustproof portion, the frame-shaped dustproof portion including a packing portion and a support frame connected to the packing portion, the packing portion including an inner peripheral rib and an outer peripheral rib, the support frame being harder than the packing portion, and (iv) a plate, the method comprising:
disposing the device holder in the opening of the holder case;
disposing the dustproof member in a gap between an outer periphery of the device holder and a wall surface of the opening of the holder case on a side opposite to a light-emitting side with respect to the semiconductor light emitting device so that the packing portion, not the support frame, becomes a front end in an insertion direction; and
pressing the dustproof member with the plate and fixing the plate to the holder case.

* * * * *